Mar. 13, 1923.

T. C. LUCE

SHOCK ABSORBER

Filed June 18, 1919

Inventor
Thomas C. Luce
By Henry E. Rockwell
Attorney

Mar. 13, 1923.

T. C. LUCE 1,448,224

SHOCK ABSORBER

Filed June 18, 1919

Inventor
Thomas C. Luce
By Henry E. Rockwell
Attorney

Patented Mar. 13, 1923.

1,448,224

UNITED STATES PATENT OFFICE.

THOMAS C. LUCE, OF STRATFORD, CONNECTICUT.

SHOCK ABSORBER.

Application filed June 18, 1919. Serial No. 305,172.

*To all whom it may concern:*

Be it known that I, THOMAS C. LUCE, a citizen of the United States, residing in the town of Stratford, county of Fairfield, and State of Connecticut, have invented certain new and useful Improvements in Shock Absorbers, of which the following is a full, clear, and exact description.

This invention relates to shock absorbers for automobiles and the like, and particularly to a combined shock absorber and rebound snubbing device.

One object of my invention is to provide a shock absorber which is simple in construction, consists of but few parts and may be very easily manufactured; and which is designed to be mounted between an end of a leaf spring and the frame supported thereby. A more specific statement of the object of my invention is to provide a shock absorber constructed in the form of a toggle and provided with a spring constructed to swing the links of the toggle about their pivotal connection towards their extended position.

Another object of my invention is to provide a shock absorber which will serve also as an efficient and satisfactory snubbing device to check the rebounding movement between a leaf spring and the frame to which it is operatively secured.

Still another object of my invention is to provide shock absorbers of the type above indicated, which may be very quickly and easily applied to the automobile or the like upon which they are to be used.

To these and other ends, the invention consists in the novel features and combinations of parts to be hereinafter described and claimed.

Figure 1:
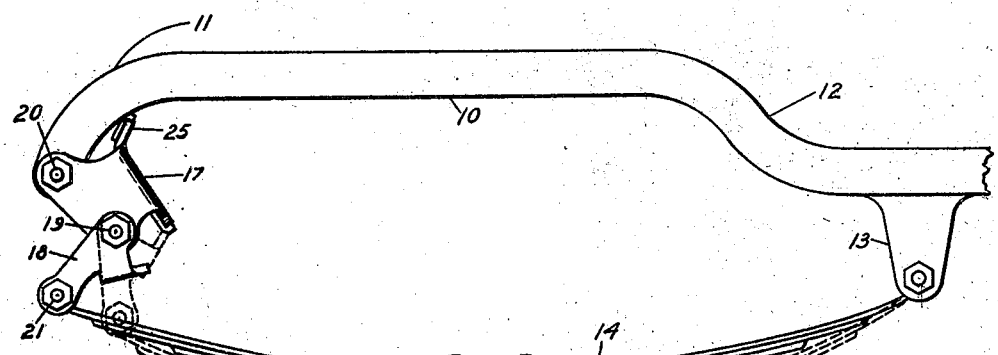
Fig. 1 is a side view of my shock absorber shown positioned between one end of a leaf spring and the rear end of the side rail of an automobile frame; the parts being shown in full lines in their normal operating position and in dotted lines in the rebound snubbing position.
Figure 2:
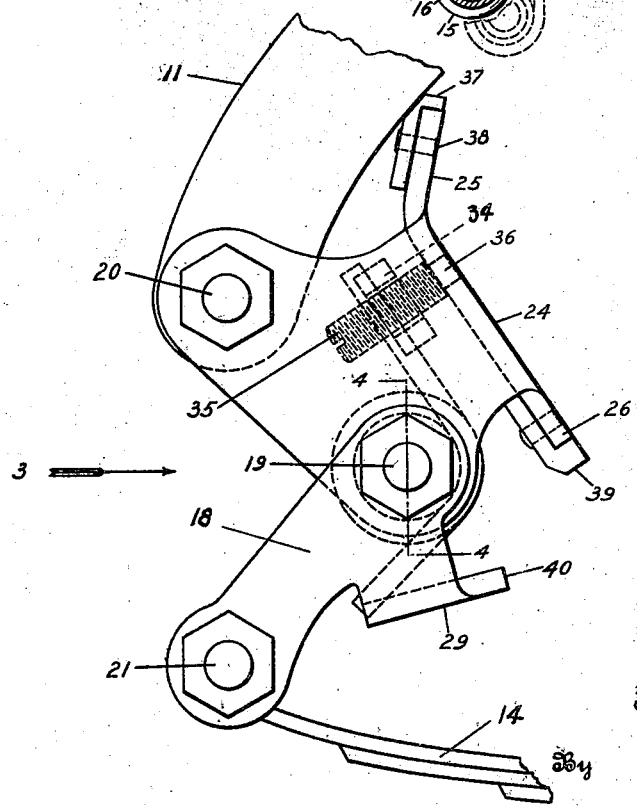
Fig. 2 is an enlarged view of my shock absorber shown in Fig. 1.
Figure 3:
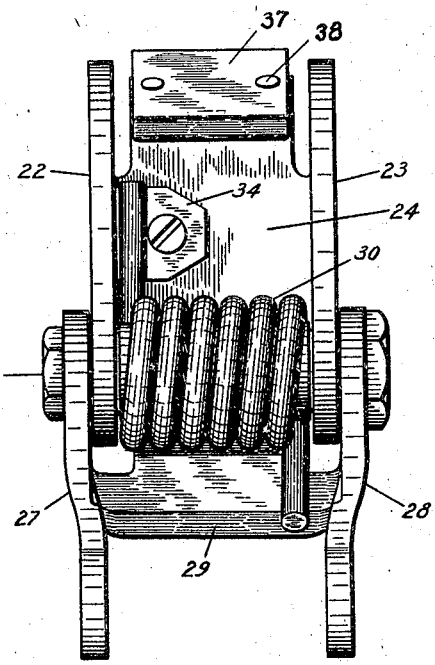
Fig. 3 is a view of my shock absorber looking in the direction of the arrow 3, shown in Fig. 2.

In order that a shock absorber will satisfactorily relieve an automobile or the like upon which it is mounted from substantially all shocks to which the automobile is likely to be submitted, it should be so constructed that the shock absorber will not only take up the shock when the wheels of the automobile or the like strike a stone or some other object rising above the surface of the road, but the shock absorber should be so constructed that it will also prevent the frame of the automobile from moving downwardly an appreciable extent when the wheels of the automobile drop into a rut, depression or the like extending across the road. That is, a shock absorber in order to do good work should be so constructed that it will continue to exert an upward pressure upon the frame of the automobile, even while the wheels and the leaf spring carried by the same are moving downwardly for an instant away from the frame. If the shock absorbers of the automobile are so constructed that they will operate in the manner just stated to prevent the frame of the automobile from dropping appreciably, the wheels will then be permitted to rise freely again when they have crossed the depression, without imparting an objectionable upward rebounding movement to the automobile frame. In order to obtain a shock absorber which will operate in this manner, I have provided a toggle with a relatively strong coiled spring, which tends to swing the links of the toggle about their pivot to the extended position, and in this manner, I obtain a shock absorber which exerts a material spreading force at its opposite ends throughout its entire range of operation and thereby obtain a shock absorber which will continue to exert a material upward force upon the frame of the automobile while the leaf spring is dropping away from the automobile.

In the embodiment of my invention illustrated in the drawings, I have designated by the numeral 10, the rear portion of one of the side rails of which automobile frames or chassis are commonly constructed. These side rails are commonly bent downwardly at their rear end, as at 11, and at an intermediate portion, such as designated by 12, and upon the portion 12 is commonly provided a downwardly projecting bracket 13 rigidly secured to the side rail. The construction of the side rail 10, so far described, is designed more particularly to have a semi-elliptical spring, such as 14, operatively secured to the same, the forward end of the spring 14 being usually bolted to the bracket 13, while the rear end of the spring 14 is commonly swingingly secured to the downwardly bent end 11, in order that the rear end of the spring may move back and forth as the load upon the same varies. The intermediate portion of the spring 14 is commonly secured by means of clamps or the like 15 to the rear axle 16 of the automobile. The construction, so far described, is well-known and forms no part of my invention.

Figure 4:
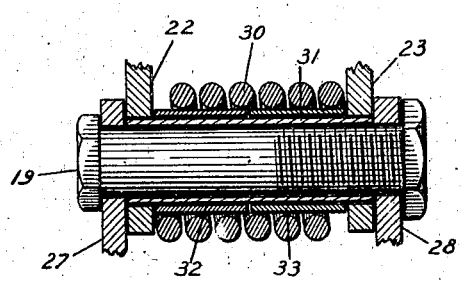
Fig. 4 is a sectional view taken on the line 4—4 of Fig. 2.

My invention consists in providing a shock absorber in the form of a spring-operated toggle, which is designed to be mounted between the rear end 11 of the side rail and an end of the leaf spring 14. In the preferred embodiment, the toggle consists of an upper link 17 and a lower link 18, the two links being pivotally secured together by a bolt 19, and the upper end of the link 17 is secured to the rail 10, preferably by a bolt 20, while the lower end of the link 18 is secured by means of a bolt 21 to the rear end of the semi-elliptical spring 14. The upper link 17 is preferably constructed of the spaced plates 22 and 23, connected together by a bridge member 24, and upon the upper edge of the bridge member 24 is preferably provided the upwardly projecting portion 25, and upon the lower edge of the bridge member is provided a downwardly projecting portion 26. The object in providing the portions 25 and 26 will be hereinafter described. The lower link 18 preferably consists of a pair of spaced plates 27 and 28 connected together by a bridge member 29, the construction of the links 17 and 18 being such that if desired they may be conveniently cut out of a plate of sheet steel, after which the parts may be bent to give the same the desired configuration. Relatively large drill-holes are formed through the upper and lower ends of the plates 22, 23, 27 and 28, in order that the adjacent ends of the links 17 and 18 may be pivotally secured together by the bolt 19, in the manner shown, more particularly in Fig. 4, while the free ends of the links 17 and 18 of the toggle may be bolted to the frame and spring respectively, in the manner above stated.

A well-known feature in the operation of a toggle is the construction whereby the same will exert great endwise pressure as the links of the toggle approach their extended position, but which endwise pressure decreases rapidly as the angle between the pivoted links of the toggle decreases. I have taken advantage of this operation of a toggle and used a spring in connection therewith, which spring tends to swing the links of the toggle to their extended position, the spring being so constructed that its tension decreases as the links approach their extended position and vice versa, the tension of the spring increases as the links are swung towards their folded position. In this manner I obtain a shock absorber which exerts substantially a uniform spreading force at the opposite ends of the toggle throughout substantially its entire range of operation. This operation is very desirable, in that even while the flexible spring 14 is moving downwardly away from the frame of the automobile, my spring-operated toggle will continue to exert a substantial upward pressure upon the frame of the automobile, and thereby prevent the frame of the automobile from dropping during the instant the wheels of the same are in a depression or the like extending across the road. In order to reduce the friction between the bolt 19 and the links pivotally secured together thereby, this bolt is preferably snugly mounted in the drill-holes formed through the spaced plates of the lower link 18, and a relatively long sleeve 31 is preferably loosely mounted upon the bolt 19 with the ends of the sleeve snugly fitted in the drill-holes formed in the plates 22, 23 of the link 17 so that the sleeve rotates upon the bolt when the toggle links move relatively to each other. The sleeve 31 has two relatively short collars 32 and 33 loosely mounted thereupon and the outside diameter of these collars is slightly less than the inside diameter of the coiled spring 30. One end of this coiled spring preferably reacts against the bridge member 29, while the opposite end of this spring preferably reacts against an adjustable nut 34, which nut is threaded upon a bolt 35 having its inner end 36 rotatably mounted in a drill-hole formed in the bridge member 24, the arrangement being such that the tension upon the spring 30 may be adjusted, as desired, by rotating the bolt 35 in one direction or the other. The collars 32 and 33 tend to reduce the friction between the coiled spring and the sleeve 31, and also tend to prevent the coils of the spring from being distorted out of alignment when the spring is under heavy tension.

I have found that the objectionable upward rebounding movement, which is commonly imparted to an automobile body at the instant the wheels of the same strike a rough place in the road, may be very satisfactorily checked by the means which I will now describe. If the opposite ends of a leaf spring, such as I have shown in the drawings, are prevented from moving towards each other when a rebounding movement is imparted to the same, the spring will be prevented from bowing upwardly, and this in turn will prevent the automobile frame from moving upwardly away from the axle of the automobile to an abnormal extent. By referring to Fig. 1, it will be apparent that the forward end of the leaf spring 14 is prevented from moving relatively to the frame 10, so that if means are provided for preventing the rear end of the spring 14 from moving towards the forward end of this spring to a position nearer than that indicated in dotted lines in this figure, a very desirable snubbing operation will be obtained. I obtain this desired result in the following manner: Upon the projection 25, above mentioned, is preferably mounted a piece of fibre or some other non-metallic material 37, secured thereto by rivets or the like 38, and the upper face of the fibre is positioned to abut against the under face of the side rail 10 to thereby limit the extent to which the link 17 may be swung about its pivot bolt 20 towards the bracket 13, and upon the projection 26 is mounted a piece of fibre or the like 39, against which the extension 40, formed upon the bridge member 29, is adapted to abut in order to limit the extent to which the link 18 may be swung about its pivotal bolt 19 towards the bracket 13. By the construction just described, it will be seen that the links 17 and 18 are free to rock away from the bracket 13, but are prevented from rocking towards this bracket to an extent greater than that indicated in dotted lines in Fig. 1. It will, therefore, be seen that this construction prevents the opposite ends of the spring 14 from bowing upwardly to an extent greater than that indicated in dotted lines, and this in turn, it will be apparent, prevents the frame of the automobile from moving upwardly away from the axle 16 to an extent greater than indicated in dotted lines in Fig. 1, so that the result of the construction, just described, is similar to the result which would be obtained if a leather strap or the like were used to connect the axle 16 to the frame 10, as is some times done to prevent objectionable upward rebound.

Although the above description is necessarily a detailed one, it will be apparent that various changes may be made in the construction of the device herein described, without departing from the scope of my invention as defined in the annexed claims.

I have illustrated and described my shock absorber as applied to the rear end of the right hand rear spring of an automobile, but it will be understood that the left hand rear spring is to be provided with a similar shock absorber, and if desired, the front springs of the automobile may also be provided with similar shock absorbers.

What I claim is:

1. In combination with an automobile or the like, a leaf spring, a frame, and means for operatively connecting one end of said spring to said frame, comprising a toggle having one end operatively connected to said spring and the other end operatively connected to said frame, and a coiled spring tending to swing the pivoted links of said toggle to their extended position, said spring acting against the knuckle of said toggle substantially at right angles to the same when so extended.

2. In combination with an automobile or the like, a leaf spring, a frame, a toggle operatively connecting one end of said spring to said frame, and means acting upon the knuckle of said toggle to swing the links of same to an extended position.

3. In combination with an automobile or the like, a leaf spring, a frame, a toggle operatively connecting one end of said spring to said frame, and means tending to swing the pivoted links of said toggle to their extended position, comprising a coiled spring so constructed and applied that the uncoiling force of same will act against the pivoted joint of said links substantially at right angles to their extended position.

4. The combination of an automobile frame, a supporting spring for said frame, and means for connecting one end of the spring to the frame, comprising a pair of links pivoted together at their adjacent ends and pivoted at their remote ends to the frame and spring respectively, said links forming a toggle with one end arranged above the other, and means acting in a substantially horizontal direction on the pivoted joint of said toggle and tending to hold the links thereof in an extended position.

5. The combination of an automobile frame, a supporting spring therefor located beneath the frame, a toggle for connecting the frame to the spring, comprising links pivoted to the frame and spring respectively, a pivot member for pivoting said links together, and means acting directly on the pivot member for exerting an extending force upon the toggle.

6. The combination of an automobile frame, a supporting spring therefor located beneath the frame, a toggle for connecting the frame to the spring, comprising links pivoted to the frame and spring respectively, a pivot member for pivoting said links together, and means acting directly on the pivot member for exerting an extending force upon the toggle in a direction substantially at right angles to the position of the links when the toggle is so extended.

7. The combination of an automobile frame, a supporting spring therefor, and a shock absorber for interconnecting said parts, comprising links pivoted at their remote ends to the frame and spring respectively, a pivot member for pivoting the links together at their adjacent ends, and means mounted upon the pivot member tending to extend the links into a position in which they are aligned with each other.

8. The combination of a vehicle frame, a supporting spring therefor, and a shock absorber interconnecting said parts, comprising links pivoted at their remote ends to the frame and spring respectively, a pivot member for pivoting the links together at their adjacent ends, and a coiled spring mounted upon the pivot member, the ends of said coiled spring acting against the links to force the same toward a position in which they are substantially aligned, the extending force of the spring being in a direction substantially at right angles to the links when in the fully extended position.

9. A shock absorber comprising a pair of links having adjacent ends pivoted together, means at the remote ends of the links for securing the same to a frame and to a supporting spring respectively, a pivot member for pivoting said links together, and a spring tending to hold said links normally in the position of an extended toggle, said spring being coiled about said pivot member and having its respective ends abutting the respective links.

10. In combination with an automobile or the like, a semi-elliptical leaf spring, a frame to which one end of said spring is non-movably fastened, a link for swingingly securing the other end of said spring to said frame, and a frame engaging stop for limiting the swinging movement of said link towards the fixed end of said spring, whereby the ends of said spring are retained a sufficient distance apart to prevent an abnormal bowing of said spring in a rebounding direction.

11. In combination with an automobile or the like, a semi-elliptical leaf spring, a frame to which one end of said spring is non-movably fastened, a link for swingingly securing the other end of said spring to said frame, and a stop positioned between said spring and frame for limiting the swinging movement of said link towards the fixed end of said spring, to thereby check rebounding movement between said spring and frame, said stop including a portion of said link positioned to abut against said frame.

12. In combination with an automobile or the like, a semi-elliptical leaf spring, a frame to which one end of said spring is non-movably fastened, a weight supporting shock absorber swingingly securing the other end of said spring to said frame, and a stop cooperating with said shock absorber to limit the movement of the shock-absorber end of said spring towards the fixed end of said spring, to thereby retain the ends of said leaf spring a sufficient distance apart to check all abnormal bowing of the same in the rebounding direction.

13. In combination with an automobile or the like, a semi-elliptical leaf spring, a frame to which one end of said spring is non-movably fastened, a toggle for operatively securing the other end of said spring to said frame, and a stop between said toggle and frame cooperating with said toggle to retain the ends of said leaf spring a sufficient distance apart to check all abnormal bowing of said spring in a rebounding direction.

14. In combination with an automobile or the like, a leaf spring, a frame, a toggle operatively connecting one end of said spring to said frame, a spring operating upon the knuckle of said toggle to swing the pivoted links of the same to their extended position, means for non-movably securing the other end of said leaf springs to said frame, and a stop for limiting the movement of the toggle end of said leaf spring towards its fixed end, to thereby retain the ends of said leaf spring a sufficient distance apart to prevent bowing of the same in the rebounding direction.

15. In combination with an automobile or the like, a leaf spring, a frame to which one end of said spring is non-movably fastened, a link for swingingly securing the other end of said spring to said frame, and a stop positioned between a portion of said link and said frame to limit the swinging movement of said link towards the fixed end of said spring, to thereby check rebounding movement between said spring and frame.

16. In combination with an automobile or the like, a leaf spring, a frame, a shock absorber mounted between said frame and one end of said spring, comprising a pair of links pivotally secured together to form a toggle, and a spring coiled about the pivot of said toggle with its ends reacting against said links to swing the same to their extended position.

17. In combination with a frame, a semi-elliptical spring for supporting said frame, one end of said spring pivotally fastened to said frame, a shock absorber in the form of a spring-operated toggle, comprising two links pivoted together at one end, the free ends respectively fastened to the frame and to the free end of the spring, a pivot member for the pivoted joint of said links, and a coiled spring wound about said pivot member, one end of said coiled spring engaging one of said links and the other end engaging the other link, whereby a pressure is exerted against the pivot of said links tending to spread the same to their extended position.

18. A shock absorber comprising a pair of links pivoted together at one end, a pivot member for pivoting said links, a coiled spring wound about said pivot member adapted to exert pressure upon said links to cause the same to spread to an extended position, and means to increase or decrease this pressure by tightening or loosening the winding of said coiled spring.

19. In a shock absorber, a toggle comprising two links, a pivot member for pivotally securing together the adjacent ends of said links, a coiled spring embracing said pivot member and adapted at each end to engage the respective links, allowing the unwinding tension of said coiled spring to be transmitted to the knuckle of said toggle, thereby causing a pressure upon the knuckle of said toggle tending to retain the links in an extended position.

20. In a shock absorber, a toggle comprising two links pivoted together at their adjacent ends, a pivot member for pivotally securing said links together, means for securing the remote ends of said links to a frame and spring respectively, means associated with the pivot member of said links for exerting pressure on the toggle knuckle and tending to hold the toggle links in an extended position, and stop means on the respective links cooperating with each other to limit the movement of the links toward a position in which they are in line with each other.

21. In a shock absorber, a toggle comprising two links pivoted together at their adjacent ends, a pivot member for pivotally securing said links together, means for securing the remote ends of said links to a frame and spring respectively, a spring coiled about the pivot member and acting at its ends against the links thereby exerting a pressure upon the pivot member tending to hold the toggle in an extended position, and stop means on the respective links cooperating with each other to limit the extending movement of the links.

22. The combination of a vehicle frame, a supporting spring for said frame, and means for connecting one end of the spring to the frame, comprising a pair of links pivoted together at their adjacent ends and pivoted at their remote ends to the frame and spring respectively, said links forming a toggle with one end arranged above the other, means acting in a substantially horizontal direction on the pivoted joint of said toggle tending to open the links to an extended position, and means on the respective links cooperating with each other to limit the opening movement.

23. In a shock absorber for a vehicle, a pair of links pivoted together at one end, means for attaching the free ends of said links to a vehicle body and the running gear of said vehicle respectively, and extending means self contained by said pair of links acting substantially at right angles to the extended position of said links against the pivoted joint thereof.

24. In a shock absorber for a vehicle, a pair of links pivoted together at one end, means for attaching the free ends of said links to a vehicle body and the running gear of said vehicle respectively, said pair of links having extending means mounted wholly thereon acting against the pivoted joint of said links substantially at right angles to their extended position, and means adjacent the pivoted ends of said links and integral therewith to limit the extending movement thereof.

25. A shock absorber for a vehicle comprising a toggle, the free ends of said toggle adapted to be attached to the body and running gear of said vehicle respectively, and means self contained by said toggle acting laterally upon the toggle joint tending to cause longitudinal movement of the links thereof.

26. A shock absorber for a vehicle, said shock absorber being in the form of a toggle having the free ends of the links of said toggle attached to the body and running gear of said vehicle respectively, and means wholly mounted upon said toggle tending to retain said toggle in an extended position.

27. A shock absorber for a vehicle, said shock absorber being in the form of a toggle having the free ends of the links thereof attached to the body frame and the frame supporting spring of said vehicle respectively, and means mounted at the pivot of said toggle, engaging said links and tending to force same to an extended position.

In witness whereof, I have hereunto set my hand on the 16th day of June, 1919.

THOMAS C. LUCE.